C. L. HORACK.

Improvement in Car-Couplings.

No. 5,117. Reissued Oct. 29, 1872.

WITNESSES.

S. A. Kemp.
C. H. S. Lange.

INVENTOR.

Carl L. Horack.

AM. PHOTO-LITHOGRAPHIC CO. N.Y. (OSBORNE'S PROCESS.)

UNITED STATES PATENT OFFICE.

CARL L. HORACK, OF WINONA, MINNESOTA.

IMPROVEMENT IN CAR-COUPLINGS.

Specification forming part of Letters Patent No. 126,702, dated May 14, 1872; reissue No. 5,117, dated October 29, 1872.

*To all whom it may concern:*

Be it known that I, CARL L. HORACK, of Winona, in the county of Winona and State of Minnesota, formerly of Hastings, in the county of Dakota and State of Minnesota, have invented a new and useful improvement on my former invention—"Improvement in Car-Couplings," patented September 26, 1871—of which the following is a full, clear, and exact description, reference being had to the accompanying drawing forming part of this specification, in which—

Figure 1:
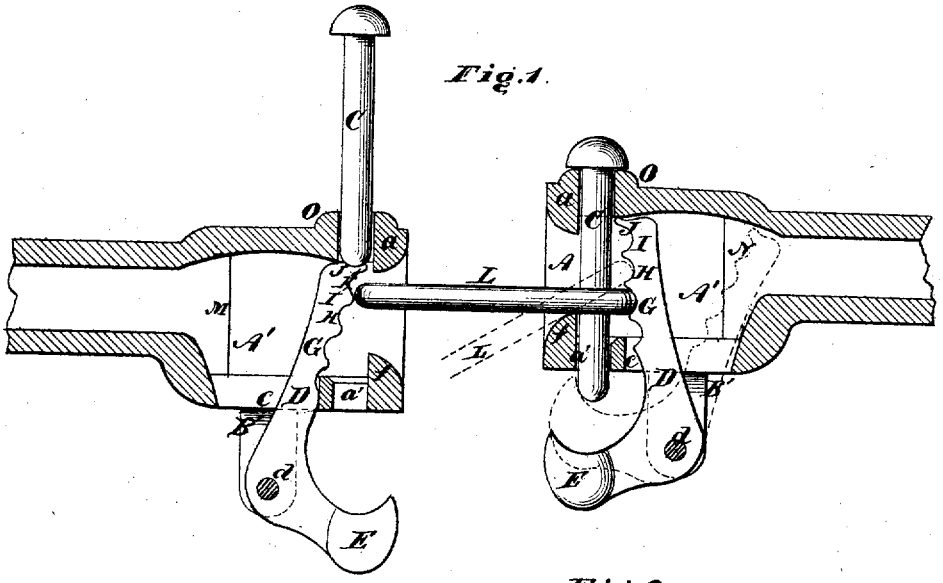
Figure 2:
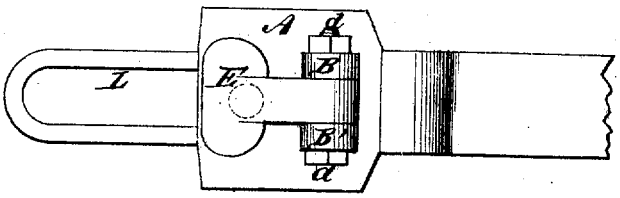

Figure 1 is a longitudinal vertical section of two car-couplings constructed according to my invention, and showing the connecting-link secured to one draw-head in the act of entering the other. Fig. 2 is a bottom view of the same.

Similar letters of reference indicate corresponding parts in both figures.

My invention relates to car-couplings; and consists in a novel construction and arrangement of the draw-head and weighted catch-bar, by means of which the link is held firmly against the pin and the operator enabled to adjust said link at any angle desired, as hereinafter specified and claimed.

To enable others to construct car-couplings according to my invention, I will proceed to describe the same with reference to the drawing. Both couplings being of similar construction, it will be sufficient to describe one of them.

A is a draw-head, which, in its general outlines, is of the ordinary form. The front end of this draw-head is formed with a spacious cavity, A′, and with two vertical openings, *a* *a′*, opposite each other. C is a locking-bolt with head. D is a swinging bar working through an opening, *c*, in the bottom of the draw-head, with a lever, E, rigidly attached to it. The face of said swinging bar contains the notches G, H, I, &c., corresponding in form with the end of the link. J is a cavity in the projection K in the upper portion of the swinging bar, corresponding in form with the end of the bolt, so as to give to the latter a firmer position before the coupling is effected. For the same purpose a tubular addition, O, is provided over the opening *a*. Said swinging bar D, with lever E, is hinged to an axle, *d* *d*, provided on the lower portion of the standards B and B′, said standards being firmly secured or cast to the under side of the draw-head.

The operation of this car-coupling is as follows: The swinging bar D, actuated by the weight of the lever E, assumes such a position within the cavity A′, when the bolt C is withdrawn therefrom, as shown in the left-hand draw-head in Fig. 1, as to prevent the latter from entering said cavity till the connecting-link L has entered into the cavity A′ and pushed against the swinging bar D, and the projection K has entirely receded from the opening *a*, when the locking-bolt C will drop through the cavity A′ and opening *a′*, as shown in the right-hand draw-head, thereby locking the link L. After both cars have been brought close together the link will swing the swinging bars in both draw-heads back between the cheeks M and N, as shown in dotted lines in the right-hand draw-head, said cheeks serving to protect them against being broken by the link. To insure the entering of the link in the cavity of the draw-head of the other car the face contains the notches G, H, I, &c., corresponding in form with the end of the link, while the mouth of the cavity A′ is formed with a projection, *f*, thus allowing to give to the link different inclinations, according to the different heights of the cars. It will readily be seen that if the projection K does not exceed in length the thickness of the iron forming the link, and if the swinging bar D is so constructed as to be in a parallel position to the bolt in the moment it is swung back just far enough to allow the bolt to drop down, the weights of the swinging bar D and the lever E will always tend to press the end of the link against the bolt, and, by means of the notches G, H, I, &c., fix the position of the link till it has entered the opposite draw-head. Said parallel position of the swinging bar to the bolt is shown in the right-hand draw-head in Fig. 1. To uncouple it is only necessary to withdraw the bolt C as far as to clear the cavity A′, when the lever E will cause the bar D to swing forward to the position shown in the left-hand draw-head in Fig. 1, in which it will support the bolt.

What is here claimed, and desired to be secured by Letters Patent, is—

In connection with the draw-head, the lever D, which is provided with a series of adjusting-notches or their equivalent, when the arrangement is such that by means of its own weight or a weight attached to it said notched lever is held or pressed forward and the link can thereby be adjusted and held between the same and the pin, substantially as specified.

CARL L. HORACK.

Witnesses:
S. A. KEMP,
GEO. T. FLINT.